United States Patent [19]
Tsujido

[11] Patent Number: 5,280,569
[45] Date of Patent: Jan. 18, 1994

[54] THREE DIMENSIONAL MODEL DESCRIBING METHOD

[75] Inventor: Yoshinori Tsujido, Hyogo, Japan

[73] Assignee: Mitsubishi Denki K.K., Tokyo, Japan

[21] Appl. No.: 639,637

[22] Filed: Jan. 10, 1991

[30] Foreign Application Priority Data

Jan. 12, 1990 [JP] Japan .................................. 2-5354
Aug. 6, 1990 [JP] Japan .................................. 2-207793

[51] Int. Cl.$^5$ ............................................. G06F 15/72
[52] U.S. Cl. ..................................... 395/127; 395/119
[58] Field of Search ............... 395/120, 125, 127, 119, 395/128, 136, 137, 138

[56] References Cited

U.S. PATENT DOCUMENTS 4,994,989  2/1991  Usami ................................ 395/120

OTHER PUBLICATIONS

Siggraph, *Real-Time Shaded NC Milling Display*, by Tim Van Hook, vol. 20, No. 4, 1986, pp. 15-20.

*Primary Examiner*—Gary V. Harkcom
*Assistant Examiner*—Huynh Ba
*Attorney, Agent, or Firm*—Sughrue, Mion, Zinn, Macpeak & Seas

[57] ABSTRACT

A three-dimensional model displaying method of displaying on a display screen a three-dimensional model expressed in a computer in the field of CAD or CAM. The quadrangular patches of the upper interface of a three-dimensional model is approximated with rectangular regions along the x-axis and y-axis of a two-dimensional coordinate system on the display screen. Accordingly, it is unnecessary to perform the operation of painting quadrangles irregular in configuration, and therefore the patch painting process can be achieved at high speed and with high accuracy.

9 Claims, 3 Drawing Sheets

100: UPPER INTERFACE 200, 201: RECTANGULAR REGION

THREE DIMENSIONAL MODEL DESCRIBING METHOD

BACKGROUND OF THE INVENTION

This invention relates to a three-dimensional model displaying method of displaying on a display screen a three-dimensional model expressed in a computer in the field of CAD or CAM.

Recently, computer graphics have remarkably advanced with improvement of hardware and software in computer technique. A technique for describing a three-dimensional model (three-dimensional model) as well as a two-dimensional model (planar model) has advanced from a wire frame method in which only the contour of an object is drawn to a solid method in which the surface of an object is described.

The display of a three-dimensional model with shading image has been disclosed in detail by the publications "Principles of Interactive Computer Graphics", "W.H. Newman & R.F. Sproull, McGRAW-HILL 1981", "Fundamentals of Interactive Computer Graphics", and "J.D. Foley & A. VAN DAM, Addison Wesley, 1982". In this connection, a method is generally employed in which the surface of a three-dimensional model is divided (or sampled) into triangular patches, quadrangular patches or polygonal patches, of which a value normal to each path is obtained by using the outer products of the sides thereof. The color of the patch is determined according to the normal, and the triangular, rectangular or polygonal region projected on the screen is painted in the color thus determined. The method will be described with reference to the ordinary case where the surface is divided into quadrangular patches. First, the surface of a three-dimensional model is divided into a number of quadrangular patches, and the normal vector of each quadrangular patch is obtained. Thereafter, the luminance of the patch is obtained according to the normal vector. The four vertexes $P_{i,j}$, $P_{i+1,j}$, $P_{i+1,j+1}$ and $P_{i,j+1}$ of the quadrangular patch are coordinate-transformed into four points $Q_{i,j}$, $Q_{i+1,j}$, $Q_{i+1,j+1}$, and $Q_{i,j+1}$ in a two-dimensional coordinate system on the display screen, respectively. Thereafter, the region defined by the four points $Q_{i,j}$, $Q_{i+1,j}$, $Q_{i+1,j+1}$, and $Q_{i,j+1}$ is painted with predetermined color and luminance. The above-described operation is carried out for all of the quadrangular patches forming the surface of the three-dimensional model, thus displaying the latter with shading image. Removal of the hidden surface can be achieved by controlling the quadrangular patch processing sequence.

The conventional three-dimensional model describing method as described above suffers from the following difficulties: In order to display a three-dimensional model with shading image, it is necessary to paint each quadrangular patch whose sides form different angles with the coordinate axes on the display screen. Therefore, in the case where the number of sampling points (or the number of quadrangular patches) is large, a heavy load is applied to the computer, and accordingly the processing speed is lowered.

The processing speed may be increased by decreasing the number of times of painting; i.e., by reducing the number of sampling points. However, this will induce another difficulty that the description of the three-dimensional model is lower in accuracy.

SUMMARY OF THE INVENTION

Accordingly, an object of this invention is to eliminate the above-described difficulties accompanying a conventional three-dimensional model describing method. More specifically, an object of the invention is to provide a three-dimensional model describing method in which it is unnecessary to paint patch regions subjected to coordinate-transformation, and which is able to display a three-dimensional model at high speed and with high accuracy with shading image.

In a three-dimensional model describing method, according to the invention, a pair of diagonal points of each of the group of quadrangular patches forming the upper and lower boundaries of each patch in the three-dimensional model are projected onto one the same coordinate value on a first coordinate axis (X-axis or Y-axis) of the two-dimensional coordinate system, and one of the remaining two points is projected on a coordinate value smaller by n (n being a natural number) than the coordinate value on which the pair of diagonal points are projected, while the other is projected on a coordinate value larger by n than the coordinate value on which the pair of diagonal points are projected, and a quadrangular patch defined by the points thus projected is approximated with a rectangular region having a width n in the direction of the X-axis or Y-axis of the two-dimensional coordinate system.

Furthermore in the three-dimensional model describing method, according to the invention, with coordinate values on the x-axis and y-axis as index, the three-dimensional model in the computer is expressed with a two-dimensional array including an upper or lower limit value on the z-axis of the three-dimensional model.

Moreover in the three-dimensional model describing method, according to the invention, the intervals of division and the sampling interval of the three-dimensional model may be independent of each other. In this case, the z-coordinate value of a point on the upper path boundary is determined from the coordinate values of four sampling points, surrounding the upper boundary point, through linear interpolation, and the point thus processed is subjected to coordinate transformation.

In the three-dimensional model describing method of the invention, the coordinate transformation from a point on the three-dimensional model into a point on the display screen is carried out with the pixels on the display screen taken into account, and patches on the three-dimensional model are approximated with simple rectangular regions or trains of pixels, which are then painted.

DESCRIPTION FOR THE PREFERRED EMBODIMENT

One preferred embodiment of this invention will be described with reference to the accompanying drawings.

Figure 1:
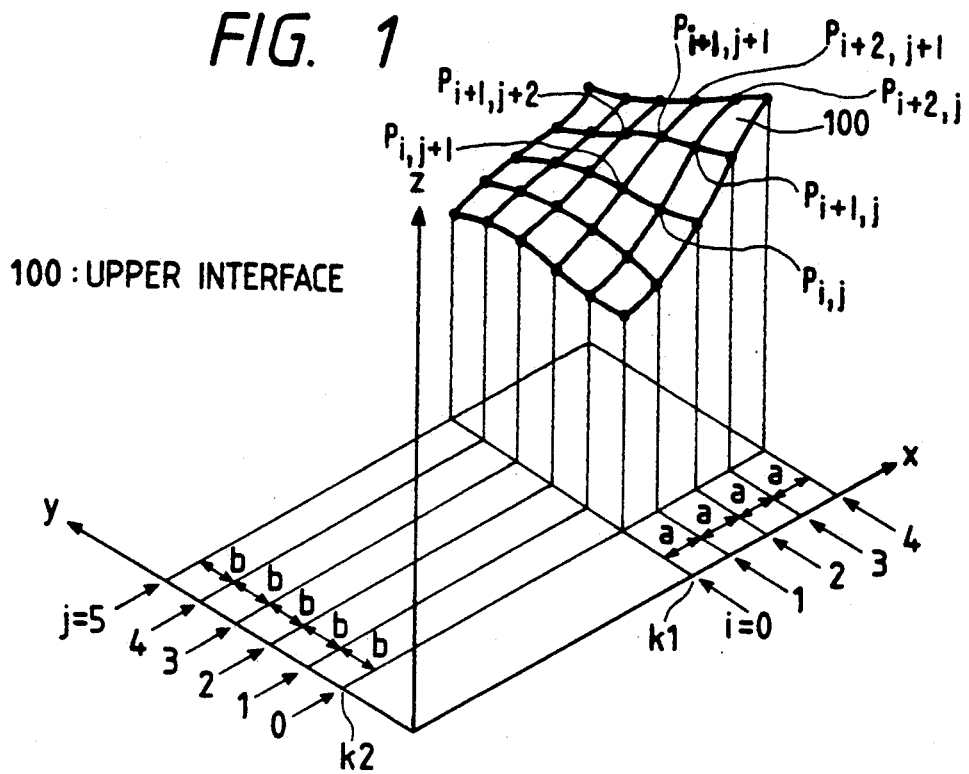
FIG. 1 is an explanatory diagram showing a three-dimensional model.

FIG. 1 is an explanatory diagram showing one example of a three-dimensional model. In the figure, reference numeral 100 designates the upper surface of the three-dimensional model.

In the three-dimensional model described above, a point (black point in FIG. 1) on the upper surface 100 can be expressed by a z coordinate having an x coordinate defined by the following equation (1) and a y coordinate defined by the following equation (2):

$$x = *i + K1 \tag{1}$$

where i=0, 1, 2, 3, and 4 in FIG. 1—the x coordinates occur at equal intervals a from a start point x=K1 in the direction of x-axis.

$$y = b*j + K2 \tag{2}$$

where j=0, 1, 2, 3, 4 and 5 in FIG. 1—the y coordinates occur at equal intervals from a start point y=K2 in the direction of y-axis and * is a multiplying symbol.

A three-dimensional model is, in general, expressed in this manner. In a three-dimensional model expressed analytically, a number of points on it can be readily obtained by sampling. Even in the case of a three-dimensional model expressed in the computer, generally the points are automatically obtained. Particularly in the case where the z coordinates of the points of the upper surface are expressed in the computer in such a manner that they are held in a two-dimensional array indicated by i and j, the data thus held can be used in the following process as they are.

Now, the operation of the embodiment will be described. In the following description, a point (black point in FIG. 1) on the upper surface of the model corresponding to an index value i,j will be represented by $P_{i,j}$. As was described above, in displaying with shading image, the normal vector of a quadrangular patch defined by four adjacent points $P_{i,j}$, $P_{i+1,j}$, $P_{i+1,j+1}$, and $P_{i,j+1}$, the luminance of the patch is calculated from the normal vector. The four points are subjected to coordinate transformation, so that they are converted into points $Q_{i,j}$, $Q_{i+1,j}$, $Q_{i+1,j+1}$, and $Q_{i,j+1}$ in a coordinate system on the display screen. The region defined by the four points $Q_{i,j}$, $Q_{i+1,j}$, $Q_{i+1,j+1}$, and $Q_{i,j+1}$ is painted in color. The embodiment relates to the coordinate transformation and the paining of the region defined by the four points.

In coordinate transformation, the following transformation equations (3) and (4):

$$X = (n/a)*(x-k1) - (n/b)*(y-k2) + k_{xoff} \tag{3}$$

$$Y = k3*(x-k1) + k4*(y-k2) + k5*z + k_{yoff} \tag{4}$$

where $K_{xoff}$, k3, k4 and k5 are constants, or offset values.

Equations (3) and (4) can be simplified into the following equations (5) and (6) by using the above-described equations (1) and (2):

$$X = n*i - n*j + k_{xoff} \tag{5}$$

$$Y = k31*i + k41*j + k5*z + k_{yoff} \tag{6}$$

where k31=k3*a, and k41=k4*b.

Figure 2:
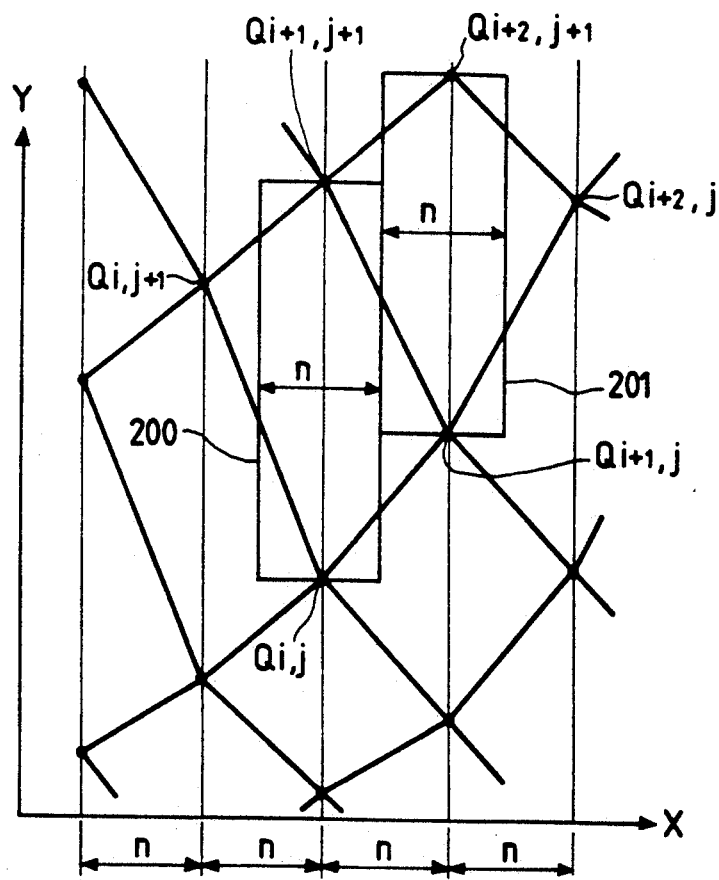
FIG. 2 is an explanatory diagram showing points which are provided in a two-dimensional coordinate system through coordinate transformation.

When equations (5) and (6) are applied to the points $P_{i,j}$, $P_{i+1,j}$, $P_{i+1,j+1}$, and $P_{i,j+1}$, then coordinate points $Q_{i,j}$, $Q_{i+1,j}$, $Q_{i+1,j+1}$, and $Q_{i,j+1}$ are obtained on the display screen as shown in FIG. 2. As is seen from equation (5), the X-coordinate value of the point $Q_{i+1,j}$ is larger by n than that of the point $Q_{i,j}$, and the x-coordinate value of the point $Q_{i,j+1}$ is smaller by n than that of the point $Q_{i,j}$. the X-coordinate value of the point $Q_{i+1,j+1}$ is equal to that of the point $Q_{i,j}$.

As shown in FIG. 2, the patch defined by the four points $Q_{i,j}$, $Q_{i+1,j}$, $Q_{i+1,j+1}$, and $Q_{i,j+1}$ is approximated with a rectangular region 200 having a width n and a length from the point $Q_{i,j}$ and the point $Q_{i+1,j+1}$. Instead of the patch defined by the four points $Q_{i,j}$, $Q_{i+1,j}$, $Q_{i+1,j+1}$, and $Q_{i,j+1}$, the rectangular region 200 is painted in a predetermined color. The rectangular region 200 can be readily painted, when compared with other irregular regions. Hence, the above-described approximation can increase the processing speed. Similarly, a quadrangular patch defined by four points $P_{i,j}$, $P_{i+1,j}$, $P_{i+1,j+1}$, and $P_{i,j+1}$ (FIG. 1) can be approximated with a rectangular region 201 having the width n and a length from the point $Q_{i+1,j}$ to the point $Q_{i+2,j+1}$ (FIG. 2). Thus, all the quadrangular patches of the upper interface are approximated with rectangular regions on the display screen.

Figure 3:
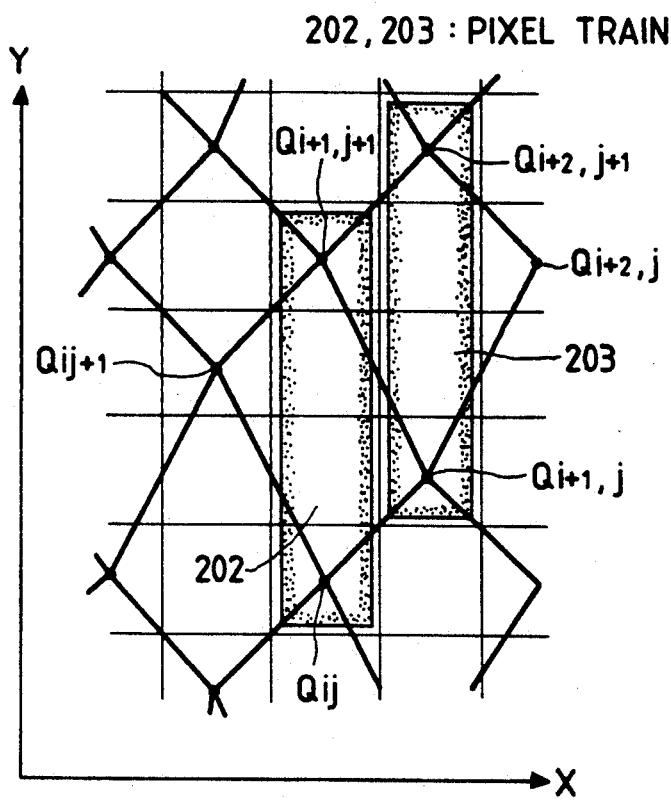
FIG. 3 is an explanatory diagram showing rectangular regions or trains of pixels obtained by approximation of quadrangles.

This approximation provides a considerably accurate result in the case where the value n is much smaller than the display region. With n=1, a particular effect is obtained. As shown in FIG. 3, according to equations (5) and (6) the X-coordinate value of the converted point $Q_{i+1,j}$ is one larger than that of the point $Q_{i,j}$, while the X-coordinate value of the converted point $Q_{i,j+1}$ is one smaller than that of the point $Q_{i,j}$, and the X-coordinate of the point $Q_{i+1,j+1}$ is equal to that of the point $Q_{i,j}$. In FIG. 3, pixel map of display screen is overlapped, and each square represents a pixel. The rectangular region to be pained has a width of "1", and a line (train) of pixels 202 should be painted. The quadrangle defined by the four points $P_{i,j}$, $P_{i+1,j}$, $P_{i+1,j+1}$, and $P_{i,j+1}$ on the upper surface 100 s approximated with a train of pixels 203 on the display screen. Thus, the painting can be achieved more readily, and the processing speed is increased as much.

The paining according to the conventional method suffers from the following difficulties: The region defined by the four points $Q_{i,j}$, $Q_{i+1,j}$, $Q_{i+1,j+1}$, and $Q_{i,j+1}$ is painted including the points $Q_{i+1,j}$ and $Q_{i+1,j+1}$. And then, when the region defined by the four points $Q_{i,j}$, $Q_{i+2,j}$, $Q_{i+2,j+2}$, and $Q_{i+1,k+1}$ is. painted, the points $Q_{i+1,j}$ and $Q_{i+1,j+1}$ are painted again. However, this difficulty can be eliminated by the approximation using rectangular regions; that is, a three-dimensional model can be described with high accuracy.

In the approximation with the rectangular regions 200 and 201 or with the trains of pixels 202 and 203, all of the pixels are on the upper surface subjected to coordinate transformation can be painted similarly as in the prior art.

With a=b, and
with k3=1/tan 60° ≈0.57735
k4=1/tan 60° ≈0.57735
k5=2/tan 60° ≈1.15470, then the coordinate transformation on the basis of equations (5) and (6) is of isometric projection, so that a general display visual angle can be obtained.

With a=b, and
with k3=0.5 =½
k4=0.5 =½
k5=1.0,
the isometric projection is not accurate, but the multiplication can be replaced by a shift operation, and the processing speed is further increased.

Figure 4:
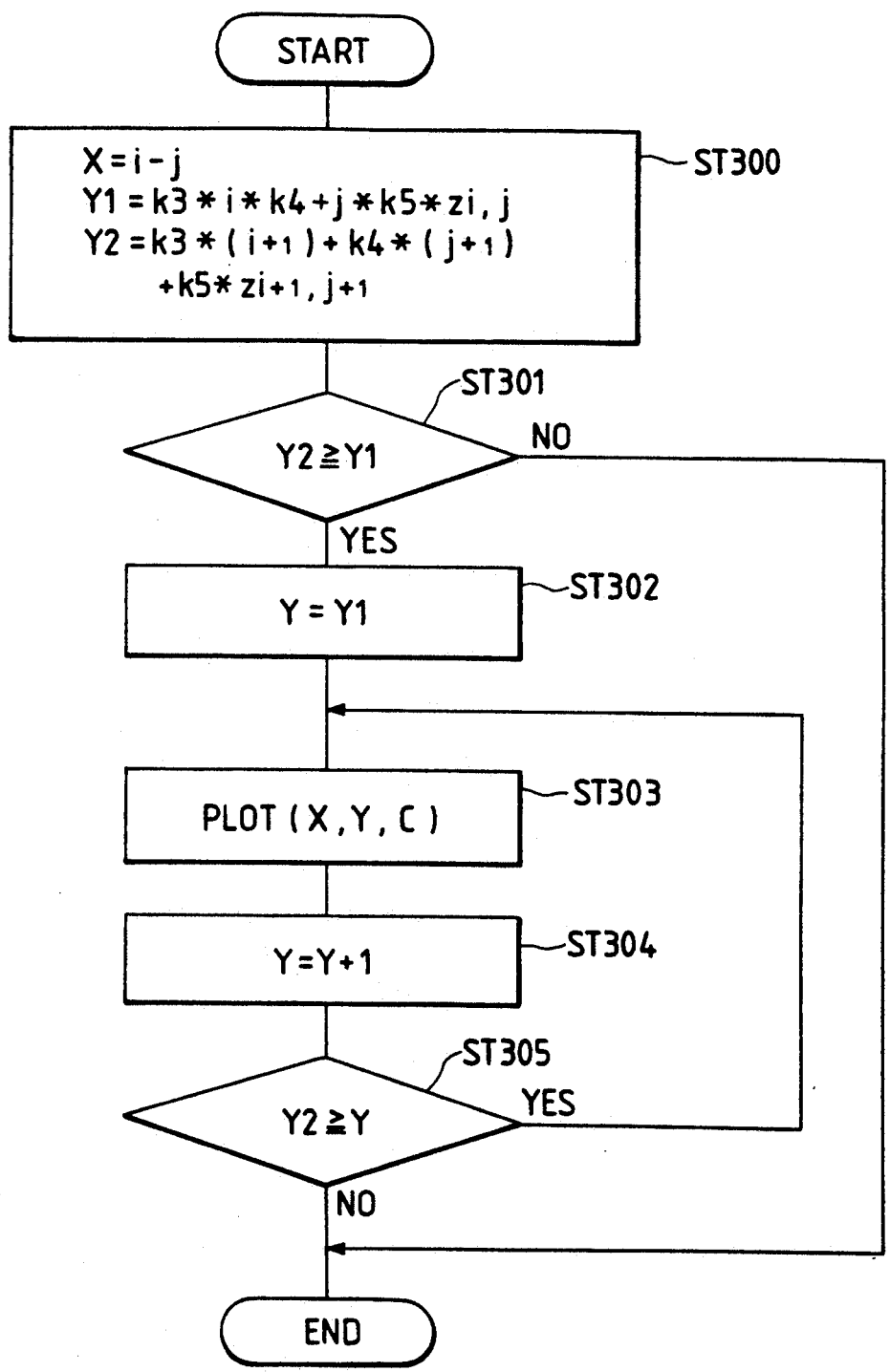
FIG. 4 is a flow chart for a description of a three-dimensional model describing method according to this invention.

A series of operations for coordinate transformation and pixel paintings will be described with reference to a flow chart of FIG. 4. FIG. 4 is for the case in which n=1, $k_{xoff}=0$, and $k_{yoff}=0$.

First, the X-coordinate value X and Y-coordinate values Y1 and Y2 of the points $Q_{i,j}$ and $Q_{i+1,j+1}$ are calculated according to equations (5) and (6) (Step ST300). Next, the values Y1 and Y2 are compared with each other (Step ST301). When Y2<Y1, then the quadrangular patch faces backward to the display screen, it is unnecessary to describe it. When Y2≧Y1, a train of pixels from the point $Q_{i,j}$ to the point $Q_{i+1,j+1}$ are painted (Steps ST303 through ST305). That is, the pixels are painted until the Y-coordinate value reaches Y2 while being increased by "1". In Step ST303, the pixel at a position X,Y on the display screen is replaced by a color c predetermined according to its patch. The above-described series of operations are carried out for all of the quadrangular patches on the upper surface of the three-dimensional model.

The above-described coordination transformation of a three-dimensional model into a two-dimensional coordinate system is a fixed transformation method using isometric projection. This transformation is sufficiently practical for expression of a three-dimensional model on the two-dimensional display screen.

Now, the case will be described in which, in expression of a three-dimensional model, the intervals of division and the coordinate transformation into two-dimensional coordinate system are independent of each other. Let us consider the case where a three-dimensional model is transformed into a pattern in a two-dimensional coordinate system. In this case, by converting the data a, b, k3, k4 and k5 in equations (3) and (4) according to the angle of rotation around the line of sight, then the three-dimensional model can be described as viewed in the direction of a desired line of sight. In the above-described embodiment, the intervals of division a and b and the sampling interval are related to each other. However, even when they are employed as parameters independent of each other, the quadrangular patches can be approximated with the rectangular regions.

Figure 5:
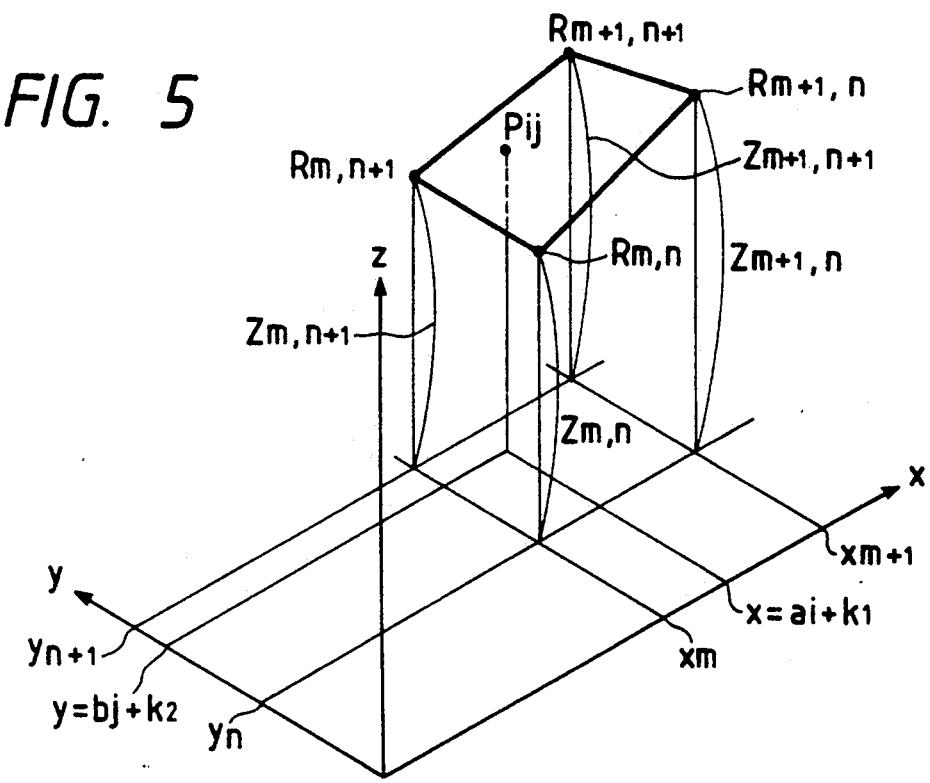
FIG. 5 is an explanatory diagram for a description of an interpolation method which is employed for obtaining z-axis values.

Next, a case will be described in which the sampling interval in the direction of the x-axis and in the direction of the y-axis is set to a constant d independent of the intervals of division a and b. In this case also, the z-axis value of a point $P_{i,j}$ on the upper surface is obtained by using the coordinate values represented by equations (1) and (2). In this case, since the intervals of division a and b are not related to the sampling interval d, the z-coordinate value of the point $P_{i,j}$ cannot be directly obtained by using "i,j". However, as shown in FIG. 5, four sampling points $R_{m,n}(X_m, Y_m, Z_{m,n})$, $R_{m+1,n}(X_{m+1}, Y_n, Z_{m+1,n})$, $R_{m+1,n+1}(X_{m+1}, Y_{n+1}, Z_{n+1})$ and $R_{m,n+1}(X_m, Y_{n+1}, Z_{m,n+1})$ surround the point having the x-coordinate value and y-coordinate value represented by equations (1) and (2) corresponding to "i,j". The z-coordinate values of these four sampling points can be utilized to obtain the z-coordinate value of the point $P_{i,j}$ by the following liner interpolation:

$$z = z_{m,n} * (x_{m+1} - x) * (y_{n+1} - y)/d^2 + \tag{7}$$

$$z_{m+1,n} * (x - x_m) * (y_{n+1} - y)/d^2 +$$

$$z_{m+1,n+1} * (x - x_m) * (y - y_n)/d^2 +$$

$$z_{m,n+1} * (x_{m+1} - x) * (y - y_n)/d^2$$

The z-coordinate value thus obtained is utilized. That is, similarly as in the above-described embodiment, the region defined by the four points $P_{i,j}$, $P_{i+1,j}$, $P_{i+1,j+1}$ and $P_{i,j+1}$ is approximated with a rectangular region or a train of pixels on the display screen, and painted in the same manner.

In the three-dimensional model describing method according to the invention, the quadrangular patches of the upper surface of a three-dimensional model is approximated with rectangular regions along the x-axis and y-axis of a two-dimensional coordinate system on the display screen. Hence, in the invention, it is unnecessary to perform the operation of painting quadrangles irregular in configuration, and therefore the patch painting process can be achieved at high speed and with high accuracy.

What is claimed is:

1. A method for displaying a three-dimensional model on a display screen, coordinates of points for the model being stored in a computer, said points being defined with respect to independent first, second and third coordinate axes, a third coordinate for each point on a surface of the model being stored in said computer with respect to corresponding coordinate values for said point on said first and second axes, said computer displaying a group of patches forming said surface, each patch being defined by four points and being transformed into a two-dimensional coordinate system for said display screen through coordinate transformation, said method comprising the steps of:

projecting first and second diagonal points defining each patch onto said two-dimensional coordinate system to a single coordinate point on a first transformed coordinate axis of the two-dimensional coordinate system;

projecting a third point from each path onto said two-dimensional coordinate system at a point along said first transformed coordinate axis that has a value smaller by an amount n than said coordinate value corresponding to said diagonal points;

projecting a fourth point for each patch onto said two-dimensional coordinate system at a point along said first transformed coordinate axis that has a value larger by an amount n than said coordinate value corresponding to said diagonal points; and approximating a patch, defined by said first through fourth points in the two-dimensional coordinate system, with a rectangular region having a width n in a direction of said first transformed coordinate axis of said two-dimensional coordinate system.

2. A method for displaying a three dimensional model as claimed in claim 1 wherein coordinate values on said first and second coordinate axes of said three-dimensional model are indices into a two-dimensional array stored in the computer, said array including one of upper and lower limits along said third coordinate axis of said three-dimensional model.

3. A method for displaying a three-dimensional model as claimed in claim 1, further comprising the step of determining coordinate values for said third coordinate axis of the three-dimensional system for the four vertices projected on said two-dimensional coordinate system based on coordinate values of four sampling points adjacent to said vertices through linear interpolation.

4. A method for displaying a three-dimensional model as claimed in claim 2, further comprising the step of determining the coordinate values on said third coordinate axis of the three-dimensional system for the four vertices projected on said two-dimensional coordinate system based on coordinate values of four sampling points adjacent to said vertices through linear interpolation.

5. A method for displaying a three-dimensional model as claimed in claim 1, wherein said projecting steps transform and project said first through fourth points onto said two-dimensional coordinate system based on the following two equations:

$$X = (n/a)*(x-k1) - (n/b)*(y-k2) + k_{xoff}, \text{ and}$$

$$Y = k3*(x-k1) + k4*(y-k2) + k5*z + k_{yoff},$$

where x, y and z represent the first, second and third coordinate axes in the three-dimensional model, k1–k5, $k_{xoff}$ and $K_{yoff}$ represent constant offset values, a and b represent intervals between adjacent points along the first and second coordinate axes of the three-dimensional model, X and Y represent values along first and second transformed coordinate axes in the two-dimensional coordinate system and n represents a distance along said first transformed coordinate axis between said third projected point and said first and second diagonal points.

6. A method for displaying a three-dimensional model as claimed in claim 1, wherein values for said third coordinate of said three-dimensional model are stored in a two-dimensional array having indices i and j, and wherein said projection steps use the following equations to transform and project said first through fourth points from said three-dimensional model to said two-dimensional coordinate system:

$$X = n*i - n*j + k_{xoff}$$

$$Y = k31*i + k41*j + k5*z + k_{yoff}$$

wherein K31 equals K3*a and K41 equals K4*b, and wherein $k_{xoff}$ and $k_{yoff}$ represent constants, z represents said third coordinate axis of said three-dimensional model, a and b represent intervals between adjacent points along said first and second coordinate axes of said three-dimensional model and X and Y represent values along first and second transformed coordinate axes of said two-dimensional model.

7. A method for displaying a tree dimensional model as claimed in claim 1, wherein said rectangular region generated in said approximating step has a length equal to the distance between said first and second diagonal points.

8. A method for displaying a three-dimensional model according to claim 1, further comprising the step of:
    displaying an approximated patch.

9. A method for displaying a three-dimensional model according to claim 1, further comprising the step of:
    coloring said rectangular region a predetermined color, wherein said rectangular region includes a single row of pixels, a number of pixels of which equals a number of pixels between the first and second diagonal points.

* * * * *

UNITED STATES PATENT AND TRADEMARK OFFICE
CERTIFICATE OF CORRECTION

PATENT NO. : 5,280,569
DATED : January 18, 1994
INVENTOR(S) : Yoshinori Tsujido et al It is certified that error(s) appears in the above-identified patent and that said Letters Patent is hereby corrected as shown below:

Column 3, line 17, delete "x*i+K1" and insert --x=a*i+K1--.

Column 4, lines 24-25, delete "$P_{i,j}$, $P_{i+1,j}$, $P_{i+1,j}$, and $P_{i,j+1}$" and insert --$P_{i+1,j}$, $P_{i+2,j}$, $P_{i+2,j+1}$, and $P_{i+1,j+1}$--.

Column 4, line 53, delete "$Q_{i+1,j}$, and $Q_{i+1,j+1}$" and insert --$Q_{i+1,j}$, and $Q_{i,j+1}$--.

Column 4, lines 54-55, delete "$Q_{i,j}$, $Q_{i+2,j}$, $Q_{i+2,j+2}$, and $Q_{i+1,k+1}$" and insert --$Q_{i+1,j}$, $Q_{i+2,j}$, $Q_{i+2,j+1}$, and $Q_{i+1,j+1}$--.

Column 5, line 64, delete "$R_{m+1,n+1}(X_{m+1},Y_{n+1},Z_{n+1})$" and insert --$R_{m+1,n+1}(X_{m+1},Y_{n+1},Z_{m+1,n+1})$--.

Signed and Sealed this

Thirteenth Day of June, 1995

*Attest:*

BRUCE LEHMAN

*Attesting Officer*   *Commissioner of Patents and Trademarks*